March 18, 1924.  
E. EVANS  
GUIDE BEARING  
Filed Oct. 16, 1922  
1,487,322
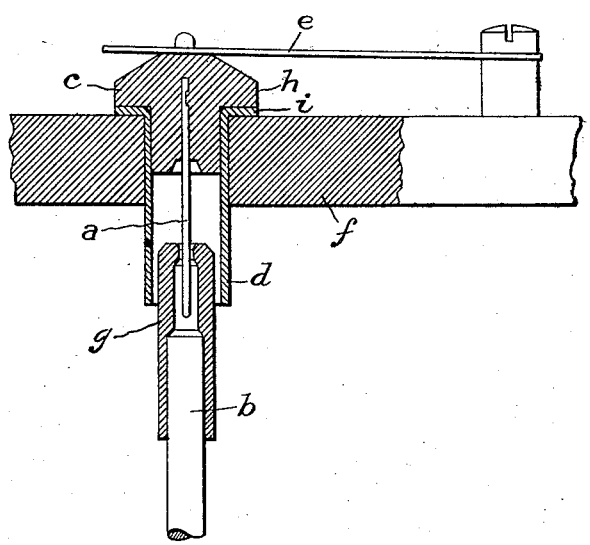
Inventor:  
Evan Evans,  
by *Alexander S. Lane*  
His Attorney.

Patented Mar. 18, 1924.

1,487,322

UNITED STATES PATENT OFFICE.

EVAN EVANS, OF BERLIN, GERMANY, ASSIGNOR TO GENERAL ELECTRIC COMPANY, A CORPORATION OF NEW YORK.

GUIDE BEARING.

Application filed October 16, 1922. Serial No. 394,924.

*To all whom it may concern:*

Be it known that I, EVAN EVANS, a citizen of the German Republic, residing at Berlin, Germany, have invented certain new and useful Improvements in Guide Bearings, of which the following is a specification.

My invention relates to guide bearings and more in particular to the upper guide bearings for vertical shafts such as those used in meters.

In the needle type bearing used as upper bearings for meters it is advantageous to have the needle surrounded by a removable cylinder which serves as a boundary for the lateral movement of the upper end of the shaft. According to my invention I provide such a cylinder which is designed to form a part of and is easily separated from the needle holder. In this way it becomes possible to have all parts of the bearing conveniently accessible at any time for the purpose of cleaning, repolishing, etc.

The features of my invention which I believe to be novel and patentable will be pointed out in the claims appended hereto. The single drawing shows a section through a meter bearing to which my invention is applied.

Referring to the drawing, the bearing needle *a* for the shaft *b* is fixed in a needle holder or block *c* and is surrounded by a cylinder *d* adapted to pass through an opening in the bearing block *f*. Preferably the upper end of shaft *b* is provided with a bearing collar *g* into the upper end of which needle *a* extends. The needle holder *c* and the cylinder *d* are made of separate parts so that the needle holder may be removed without the cylinder. Both parts *c* and *d* are so constructed, for example, by means of collars *h* and *i*, that they may be pressed against the bearing block or support *f* by means of a simple leaf spring *e* and thus held in operating position. The cylinder *d* and needle *a* are made quite long in order that the top of the rotating shaft will clear the bearing block *f* when the cylinder is raised and in order that the needle may absorb any vibrations of the rotating element.

This simple construction makes it possible to readily remove the holder *c* and needle *a* without disturbing or otherwise supporting the rotating element. If it is also desirable to remove the rotating element or move it laterally, the cylinder *b* may also be removed or raised a sufficient distance to clear the vertical shaft.

Although the invention has been described as applied to a meter it is not necessarily limited to this use and it may to advantage be applied wherever this type of bearing is used.

What I claim as new and desire to secure by Letters Patent of the United States, is:

1. A guide bearing for shafts comprising a bearing support provided with an opening, a cylinder provided with a flange at one end removably supported in said opening with the flange abutting against said support and with the other end of the cylinder extending through and beyond said support, a needle holder provided with a flange at one end removably supported in said cylinder with its flange abutting against the flange of the cylinder, a needle secured in said holder and a shaft provided with a bearing recess in an end thereof into which said needle extends beyond said support and within said cylinder.

2. In combination a rotatable shaft provided with a bearing recess on an end thereof, a guide bearing for said shaft comprising a support positioned beyond the end of said shaft, a cylinder removably suptended in an opening in said support and extending toward said shaft beyond the support, a needle holder removably supported in said cylinder and a needle secured in said holder and extending into the bearing recess on said shaft, said parts being so proportioned that the cylinder normally forms a boundary for excessive lateral movements of said shaft.

3. An upper bearing for meters and the like comprising in combination a rotatable member having a chamber in its upper end, a stationary support above said shaft having an opening in alinement with said shaft, a cylinder supported in said opening having its lower end loosely surrounding the upper end of said shaft below said support and a needle supported in said cylinder and extending into said chamber, said cylinder and needle being separately removable from the top of said stationary support.

In witness whereof, I have hereunto set my hand this 27th day of September, 1922.

EVAN EVANS.